(12) United States Patent  
Edvardsson

(10) Patent No.: US 9,515,521 B2  
(45) Date of Patent: Dec. 6, 2016

(54) DETECTOR ARRANGEMENT IN AN ELECTRIC ARRANGEMENT WITH STAND BY SHUT DOWN

(71) Applicant: Isaberg Rapid AB, Hestra (SE)

(72) Inventor: Arne Edvardsson, Hestra (SE)

(73) Assignee: Isaberg Rapid AB, Hestra (SE)

( * ) Notice: Subject to any disclaimer, the term of this patent is extended or adjusted under 35 U.S.C. 154(b) by 383 days.

(21) Appl. No.: 14/355,602

(22) PCT Filed: Oct. 18, 2012

(86) PCT No.: PCT/SE2012/000163  
§ 371 (c)(1),  
(2) Date: May 1, 2014

(87) PCT Pub. No.: WO2013/074011  
PCT Pub. Date: May 23, 2013

(65) Prior Publication Data  
US 2014/0285011 A1    Sep. 25, 2014

(30) Foreign Application Priority Data  
Nov. 15, 2011 (SE) ...................... 1100850

(51) Int. Cl.  
*H02J 3/14* (2006.01)  
*H02J 11/00* (2006.01)  
(Continued)

(52) U.S. Cl.  
CPC .............. *H02J 11/00* (2013.01); *H01H 9/167* (2013.01); *H02P 29/00* (2013.01); *Y10T 307/391* (2015.04)

(58) Field of Classification Search  
CPC .............. H02J 3/14; H02J 9/061; H02J 9/062; Y02B 70/3225  
(Continued)

(56) References Cited

U.S. PATENT DOCUMENTS 5,349,586 A    9/1994    Katsuta  
5,736,833 A *  4/1998    Farris .................... H02J 9/061  
                                           320/140  
(Continued)

FOREIGN PATENT DOCUMENTS

EP    1 286 335       2/2003  
JP    57-064015 U1    4/1982  
JP    02-086096 A     3/1990

OTHER PUBLICATIONS

Office Action issued Jul. 26, 2016 in Japanese Patent Application No. 2014-542274.

*Primary Examiner* — Jared Fureman  
*Assistant Examiner* — Alfonso Perez Borroto  
(74) *Attorney, Agent, or Firm* — Shapiro, Gabor and Rosenberger, PLLC

(57) ABSTRACT

A detector arrangement included in an electric circuit arrangement which includes a stand by shut down and which comprises a first power supply (1) which is connected to mains voltage and which converts the mains voltage to a first voltage adapted for an electric motor (5) included in the electric circuit, the first power supply being, by means of a supply conductor (3) across a switch (4) by which the electric circuit may be closed or opened, is connected with its positive pole (2) to said motor, and the motor is, by means of a return conductor (6), connected to the negative pole (7) of said first power supply, as well as a control circuit (15) which, on the one hand, is connected via a first signal conductor (16), to the first power supply and, on the other hand, to an included second power supply (1 1) which feeds the control circuit with a second voltage which is substantially lower than the first voltage and which, with its negative pole, is connected to the return conductor, and detector means for registering the state of the switch, said means being connected to the control circuit for control (Continued)

Figure 1:
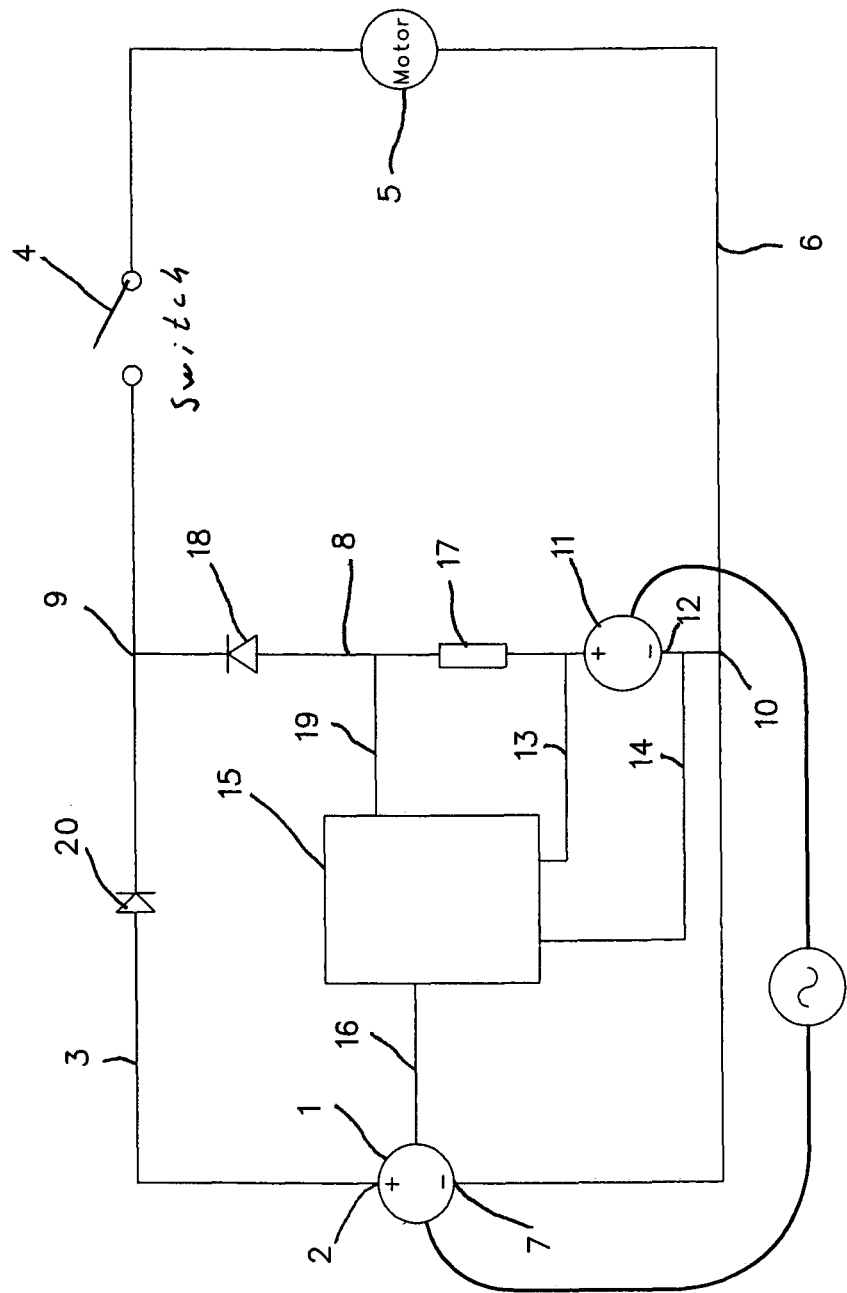

thereof by the first power supply between the energised state in which the switch is in the on position and in which the power supply emits voltage, and a shut down state in which the switch is in the off position and in which the power supply emits no voltage where the detector arrangement includes a resistor (17) and a first diode (18) which are connected in series and are included in a crosswire.

3 Claims, 2 Drawing Sheets

(51) Int. Cl.
*H01H 9/16* (2006.01)
*H02P 29/00* (2016.01)

(58) Field of Classification Search
USPC .................................................... 307/64–66
See application file for complete search history.

(56) References Cited

U.S. PATENT DOCUMENTS

| | | | |
|---|---|---|---|
| 6,661,116 B1* | 12/2003 | Seto | H02J 7/0063 |
| | | | 307/10.1 |
| 7,288,858 B2 | 10/2007 | Muth et al. | |
| 2006/0061217 A1 | 3/2006 | Makino et al. | |
| 2007/0055908 A1* | 3/2007 | Kubo | H02J 9/061 |
| | | | 714/14 |
| 2009/0189568 A1* | 7/2009 | Vasselin | H02J 7/0068 |
| | | | 320/134 |

\* cited by examiner

DETECTOR ARRANGEMENT IN AN ELECTRIC ARRANGEMENT WITH STAND BY SHUT DOWN

TECHNICAL FIELD

The present invention relates to a detector arrangement included in an electric circuit arrangement which includes a stand by shut down and which comprises a first power supply which is connected to mains voltage and which converts the mains voltage to a first voltage adapted for an electric motor included in the electric circuit, the first power supply being, by means of a supply conductor across a switch by which the electric circuit may be closed or opened, connected with its positive pole to said motor, and the motor is, by means of a return conductor, connected to the negative pole of said first power supply, as well as a control circuit which, on the one hand, is connected via a signal conductor, to the first power supply and, on the other hand, to an included second power supply which feeds the control circuit with a second voltage which is substantially lower than the first voltage and which, with its negative pole, is connected to the return conductor, and detector means for registering the state of the switch, said means being connected to the control circuit for control of the first power supply between the energised state in which the switch is in the on position and in which the power supply emits voltage, and a shut down state in which the switch is in the off position and in which the power supply emits no voltage.

BACKGROUND ART

Detector arrangements included in electric arrangements of the above-disclosed type are common in the art. As a rule, such arrangements are included in every apparatus fitted with an electrically driven motor. The drawback inherent in these prior art arrangements is that they display detector means which are connected to the switch and which, after having registered a change of switch position across a separate conductor convey this change to the control circuit included. This separate conductor is normally difficult to mount in place since it is often a matter of very small and unstable parts which must be connected together, and there is therefore a serious risk that mounting in place will not be satisfactory, which easily results in the apparatus ceasing to function.

PROBLEM STRUCTURE

There is thus a need in the art to be able to provide a detector arrangement which requires no separate conductor for transmitting the detected switch position to the control circuit and which thereby overcomes the assembly drawbacks which exist in prior art arrangements.

SOLUTION

The present invention provides a solution which obviates the above-disclosed drawbacks by a detector arrangement of the type disclosed in the introduction which is characterised in that the detector arrangement includes a resistor and a diode which are connected in series and are included in a crosswire which runs between the positive pole of the second power supply and the supply conductor, and in that there is connected, between the diode and the resistor, a conductor which is connected to the control circuit. Further, the present invention is characterised in that the resistor is connected closer to the power supply than the diode, and where the diode is connected with its anode to the resistor.

Further, the present invention is characterised in that there is connected, to the supply conductor ahead of the connection of the crosswire to the supply conductor, a second diode which is connected with its anode in a direction towards the power supply.

BRIEF DESCRIPTION OF THE ACCOMPANYING DRAWINGS

Figure 2:
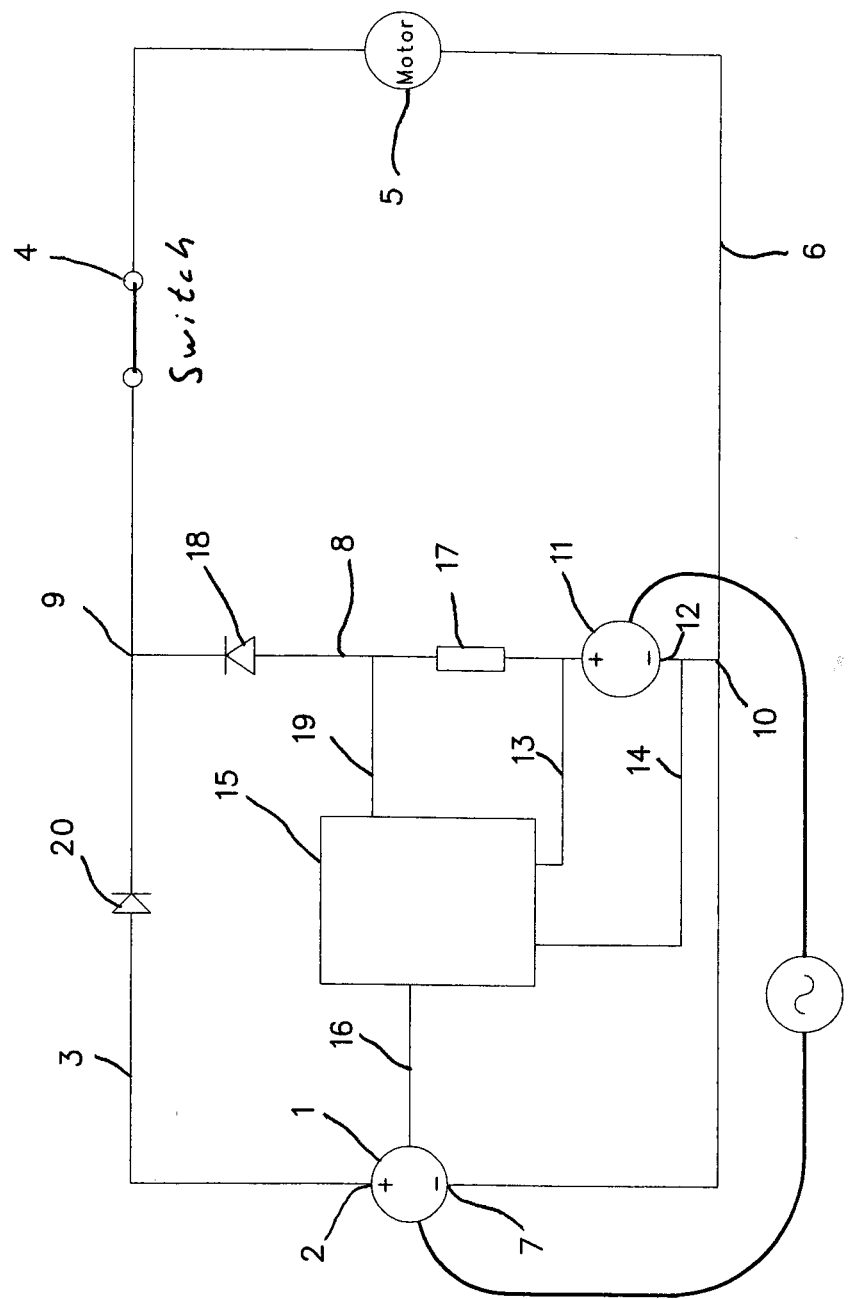

The present invention will now be described in greater detail hereinbelow with reference to the accompanying Drawings. In the accompanying Drawings:

FIG. 1 is a coupling diagram which includes the invention under consideration here, and where a switch included therein is in the open position; and FIG. 2 shows the coupling diagram of FIG. 1 where the switch included is in the closed position.

DESCRIPTION OF PREFERRED EMBODIMENT

With reference to FIG. 1, the Figure shows a first power supply 1 which, in a known manner, is connected to mains supply. In the power supply, a conversion takes place, in a known manner of the incoming voltage to a voltage which is considerably lower than the mains voltage. From the positive pole 2 of the power supply, runs a first supply conductor 3 and, across a switch 4, is connected to a motor 5. In the Figure, the switch is in an open position. From the motor 5 runs a first return conductor 6 to the negative pole 7 of the power supply. Between the supply conductor and return conductor runs a crosswire 8 which, with a first coupling 9, is connected to the supply conductor 3, and a second coupling 10 connected to the return conductor 6. A second power supply 11 is disposed at the crosswire and is also, in a known manner, connected to mains voltage. The second power supply is coupled with its negative pole 12 to the return conductor 6 and feeds, across a second supply conductor 13 and a second return conductor 14, an included control circuit 15 with that voltage which is required for the control circuit to be able to carry out its function. The voltage conversion which, in a known manner, takes place in the second power supply is to a voltage which is considerably lower than the voltage conversion which takes place in the first power supply. A signal conductor 16 is coupled between the control circuit 15 and the first power supply. A resistor 17 and a first diode 18 are disposed on the crosswire 8. The diode 18 is connected such that its anode is turned to face towards the resistor. Between the resistor 17 and the diode 18, the crosswire 8 is connected with a second signal conductor 19 to the control circuit 15. Further, in the region between the coupling 9 and the first power supply on the first supply conductor, there is coupled a second diode 20.

The invention will hereafter be described with reference to FIGS. 1 and 2. When the switch is located in the position shown in FIG. 1, voltage is fed from the second power supply to the control circuit which, in a known manner, emits a signal which shut down the first power supply. As a result, no current from the first power supply is fed to the supply conductor 3. When the switch is closed to the position which is shown in FIG. 2, an electric circuit is closed which runs from the second power supply, through the resistor, the first diode, the switch, and the motor. This results, in a known manner in the voltage in the crosswire 8 between the resistor and the diode falling considerably. This drop is registered through the second signal conductor 19 of the control circuit 15 which, in a known manner, switches the first power supply 1, across the first signal conductor 16 so as to emit voltage, whereby the motor is started. In that the first power supply is closed off when the switch is located in the open position, only an extremely slight voltage consumption takes place since the voltage which is emitted from the second power supply is considerably lower than the voltage which is emitted from the first power supply. The control circuit which is included in the present invention may consist of any microprocessor known to a person skilled in the art.

Since the detection of the different positions of the switch that is carried out is put into effect through the change of voltage that occurs in the crosswire, the advantage will be gained that there is no need for a separate conductor for transferring switch position. By including the second diode 20, the advantage is gained that the function of the invention is ensured in that the current which passes from the second power supply via the resistor and the diode 18 is prevented from passing via another route other than through switch and motor.

What is claimed is:

1. A detector arrangement included in an electric circuit arrangement which includes a stand by shut down and which comprises a first power supply (1) which is connected to mains voltage and which converts the mains voltage to a first voltage adapted for an electric motor (5) included in the electric circuit, the first power supply being, by means of a supply conductor (3) across a switch (4) by which the electric circuit may be closed or opened, is connected with its positive pole (2) to said motor, and the motor is, by means of a return conductor (6), connected to the negative pole (7) of said first power supply, as well as a control circuit (15) which, on the one hand, is connected via a first signal conductor (16), to the first power supply and, on the other hand, to an included second power supply (11) which feeds the control circuit with a second voltage which is substantially lower than the first voltage and which, with its negative pole, is connected to the return conductor, and detector means for registering the state of the switch, said means being connected to the control circuit for control thereof and of the first power supply between the energised state in which the switch is in the on position and in which the power supply emits voltage, and a shut down state in which the switch is in the off position and in which the power supply emits no voltage characterised in that the detector arrangement includes a resistor (17) and a first diode (18) which are connected in series and are included in a crosswire (8) which runs between the positive pole of the second power supply and the supply conductor, and in that there is connected, between the diode and the resistor, a second signal conductor (19) which is connected to the control circuit (15).

2. The detector arrangement as claimed in claim 1, characterised in that the resistor (17) is coupled closer to the second power supply (11) than the first diode (18), and where the diode is coupled with its anode towards the resistor.

3. The detector arrangement as claimed in claim 2, characterised in that a second diode (20) is coupled to the supply conductor (3) ahead of the coupling (9) of the crosswire (8) to the supply conductor (3), the second diode being coupled with its anode in a direction towards the power supply.

\* \* \* \* \*